(12) United States Patent
Derenski

(10) Patent No.: US 7,344,260 B2
(45) Date of Patent: Mar. 18, 2008

(54) STOWABLE LASER EYE PROTECTION

(75) Inventor: Peter A. Derenski, Kirkwood, MO (US)

(73) Assignee: The Boeing Company, Chicago, IL (US)

(*) Notice: Subject to any disclaimer, the term of this patent is extended or adjusted under 35 U.S.C. 154(b) by 219 days.

(21) Appl. No.: 10/874,123

(22) Filed: Jun. 22, 2004

(65) Prior Publication Data

US 2005/0280897 A1 Dec. 22, 2005

(51) Int. Cl.
*G02B 27/00* (2006.01)
*B01J 3/00* (2006.01)

(52) U.S. Cl. ............... 359/601; 359/608; 359/614; 296/97.6; 296/97.4

(58) Field of Classification Search ........ 359/601–614, 359/227–236, 885–890
See application file for complete search history.

(56) References Cited

U.S. PATENT DOCUMENTS

| | | | | |
|---|---|---|---|---|
| 2,055,511 A | | 9/1936 | Twiss | 160/298 |
| 2,328,263 A | | 8/1943 | Stefano | 160/23.1 |
| 3,183,033 A | * | 5/1965 | Stulback | 296/97.2 |
| 3,584,910 A | * | 6/1971 | Lupul | 296/97.6 |
| 3,719,220 A | | 3/1973 | Small | 160/108 |
| 4,197,896 A | | 4/1980 | Reichstadt | 160/107 |
| 4,607,875 A | * | 8/1986 | McGirr | 296/97.7 |
| 4,649,980 A | | 3/1987 | Kunz | 160/98 |
| 4,807,684 A | | 2/1989 | Melton | 160/23.1 |
| 4,848,437 A | | 7/1989 | Laniado et al. | 160/370.22 |
| 4,879,167 A | * | 11/1989 | Chang | 428/215 |
| 4,918,752 A | * | 4/1990 | Briggs | 2/6.2 |
| 4,944,341 A | | 7/1990 | Trippner et al. | 160/98 |
| H000979 H | * | 11/1991 | Kelley | 244/129.3 |
| 5,076,633 A | * | 12/1991 | Hsu et al. | 296/97.4 |
| 5,170,830 A | | 12/1992 | Coslett | 160/84.04 |
| 5,238,738 A | | 8/1993 | Miller | 428/333 |
| 5,245,993 A | | 9/1993 | McGrady et al. | 128/201.22 |
| 5,291,934 A | | 3/1994 | Ouvrard et al. | 160/310 |
| 5,344,206 A | * | 9/1994 | Middleton | 296/97.8 |
| 5,947,544 A | * | 9/1999 | Hubeshi | 296/97.4 |
| 6,047,762 A | | 4/2000 | Anderson | 160/370.22 |

(Continued)

OTHER PUBLICATIONS

Defense Production Act Title III Program (http://www.dtic.mil/dpatitle3/lpe.htm) ; Mar. 11, 2004; 2 pages.

(Continued)

*Primary Examiner*—Thong Nguyen
(74) *Attorney, Agent, or Firm*—Alston & Bird LLP

(57) ABSTRACT

A stowable laser eye protection system is provided as a solution for protecting the eyes of pilots and other vehicle operators and optical sensors such as during critical phases of flight and for general protection against a wide range of spectral wavelengths. A stowable laser eye protection system provides protection that can be manually or automatically extended and retracted. For example, by installing flexible laser protective films on rollers at each window of an aircraft cockpit, the protection can be put in place during taxi before take-off and stowed when the aircraft is a safe distance away from a potential threat area such as after reaching a particular altitude. A similar activity could be used for approach and landing, where the protection is extracted when the aircraft approaches a threat condition or critical phase of flight and retracted after landing.

44 Claims, 4 Drawing Sheets

U.S. PATENT DOCUMENTS

| | | | |
|---|---|---|---|
| 6,227,601 B1 * | 5/2001 | LaFrance | 296/97.4 |
| 6,354,354 B1 | 3/2002 | Schmidt | 160/98 |
| 6,411,451 B1 | 6/2002 | Fliss et al. | 359/890 |
| 6,556,336 B2 * | 4/2003 | Hutcheson et al. | 359/241 |
| 6,572,173 B2 * | 6/2003 | Muller | 296/97.2 |
| 6,637,877 B1 | 10/2003 | Hartley et al. | 351/44 |
| 6,644,610 B1 | 11/2003 | Petrenko | 248/267 |
| 6,652,778 B1 | 11/2003 | Twarowski | 252/582 |
| 6,666,493 B1 | 12/2003 | Naik | 296/974 |
| 7,216,917 B2 * | 5/2007 | Tadakamalla | 296/97.4 |
| 2002/0159155 A1 | 10/2002 | O'Brien | 359/614 |
| 2004/0027700 A1 | 2/2004 | Yoshida | 359/883 |

OTHER PUBLICATIONS

Aircrew Laser Eye Protection (ALEP) (http://www.brooks.af.mil/HSW/YA/YAC/YACL/alep.htm); May 12, 2004; 1 page.

Auto Car Roller Window Shade By Safety 1st Model 00122 10125; (http://www.cyberbabymall.com/00122.html); Apr. 15, 2004; 1 page.

Brevi Car Sun Shade: (http://www.jadesbabyequipment.co.uk/x3061.html); Apr. 15, 2004; 1 page.

* cited by examiner

STOWABLE LASER EYE PROTECTION

FIELD OF THE INVENTION

The present invention relates generally to eye protection, and, more particularly, to stowable laser eye protection for operators of vehicles.

BACKGROUND

Light amplification by stimulated emission of radiation (LASER), also known as lasers or laser beams, presents potentially dangerous implications and hazards for optical sensors, including the human eye. Optical sensors can be damaged irreparably by exposure to laser beams, and lasers present a distracting interference for normal flight conditions. For example, the FAA receives numerous complaints about laser interference from flight crews due to laser light shows in Las Vegas, Nev., and at entertainment parks and facilities at such locations as Anaheim, Calif., and Orlando, Fla. In addition to the distracting interference of laser light shows, the increased threat of terrorism coupled with the ease of accessibility to laser systems and optics, presents an increased risk for commercial and military pilots. Similar risks and hazards are presented against drivers and pilots of other vehicles, such as vehicles for ground transportation and water vessels. Potential threat risks include the effects of dazzle, disorientation, flash blindness, and permanent eye damage or blindness. These hazards and risks threaten the safety of the crew, any passengers, and the vehicle, particularly if an event occurs during a critical phase such as during takeoff and landing of an aircraft. Any degradation of the visual capability of a pilot during takeoff and landing for even a short duration can have disastrous results. Additional implications resulting from such an incident may be immeasurable. Depending upon the environmental conditions such as ambient light levels and the power and use of the laser, recovery from the exposure of such an event can be a few seconds to several minutes or more.

Many devices have been suggested and used to protect against lasers. Physical barriers such as protective curtains, absorption shields, reflective shields, and filters have all been implemented. Eyewear such as protective spectacles or visors, goggles, lenses, and binoculars have incorporated similar laser protective measures. However, none of these devices or methods are suitable for commercial pilots or effectively and conveniently protect against laser threats to commercial or military pilots. These methods can be cumbersome, intrusive, or prohibit acceptable vision for flight control and navigation. Many of these methods and devices have low or no light transmittance, inhibit or reduce the ability of a pilot to perform other visual tasks, or increase the overall workload for a pilot. Therefore, a need exists for an improved solution to protect against laser threats that does not unduly burden the activities or operation of a driver or pilot, prevent visual navigation of the vehicle by the pilot, and effectively protects against laser threats.

SUMMARY OF THE INVENTION

In light of the foregoing background, embodiments of the present invention provide stowable laser eye protection. The present invention provides a solution for protecting the eyes of individuals, such as pilots and other vehicle operators, and optical sensors, such as electronic detectors and cameras, during critical phases of flight and for general protection against a wide range of spectral wavelengths. The present invention provides protection that can be automatically or simply and easily extracted or donned when needed and automatically or simply and easily stowed or doffed. For example, in one embodiment of the present invention, by installing flexible laser protective films on rollers at each window of an aircraft cockpit, protection can be put in place during taxi before take-off and stowed when the aircraft is a safe distance away from a potential threat area such as after reaching a particular altitude. A similar activity could be used for approach and landing, where the protection is implemented when the aircraft approaches a threat condition or critical phase of flight and retracted after landing.

One embodiment of the present invention provides a stowable laser protection system that includes a laser protective film and a protective storage housing connected to the film, wherein the film is retractably-stored in the housing. The laser protective film may be a dyed substrate and a thin-film coating. The combination of the dyed substrate and thin-film coating may permit the film to exhibit an optical density that is transparent within a portion of the visible spectrum and translucent or impermeable at laser wavelengths. Transparent is used herein to mean that one can see through the material like glass, and a transparent material could be either glass or such materials that may be tinted and not as clear as glass, such as a clear substrate injected with a dye and covered with a thin film coating. A dyed substrate may be a plastic such as acrylic, polycarbonate, or the like. A thin film coating may be a dielectric or rugate film or the like. A laser protective film may include a cross member affixed across a leading edge of the film to allow for extraction of the film from the housing. The cross member provides a structure on which the film may be mounted and by which the film may be latched or attached in an extended position to cover a window. The protective storage housing may include a force element such as a spring-loaded roller, a tension coil spring, a constant force spring, a friction-resistance roller, or the like to provide for retractably-storing the protective film in the housing.

Another embodiment of the present invention provides a stowable eye protection system for a vehicle including a laser protective film, a protective storage housing connected to the film and mounted to a vehicle adjacent to or within a window of the vehicle where the film is capable of retracting into the housing for storage in the housing and extraction from the housing to cover at least part of the window. The housing may be mounted below, above, beside, or integrally within the window. In a further embodiment of the present invention, a stowable eye protection system for a vehicle may include a manual extraction element or a motor connected to the film to permit manual or motor-assisted extraction and retraction of the film from or into the housing. The housing may include a force element such as to permit motorized extraction and forced retraction of the film or motorized retraction and forced extraction of the film from the housing.

In a further embodiment of a stowable eye protection system for a vehicle, a control element may automatically activate a motor, electronic latch, or the like to extract or retract the film. Where the vehicle may be an aircraft, the control element may cause the extraction of the film after an aircraft descends to a predetermined landing altitude or approaches within a predetermined distance from a threat condition such as a particular geographic area known to exhibit or present a risk of laser hazards. The control element may retract the film after an aircraft lands or is a predetermined distance away from a threat condition. Similarly, the control element may extract the film for take-off of an aircraft. And the control element may retract the film after the aircraft ascends to a predetermined post-take-off altitude. As described, a control element may be used to provide laser protection for take-off or landing of an aircraft for when an aircraft is proximate a predetermined threat location. A motor that is used with a housing may be attached to the housing, attached to a roller of the housing, or separate from the housing but interconnected with the film or the housing for extraction or retraction of the film.

One embodiment of the present invention provides a method of protecting the vision of a vehicle pilot including providing a flexible film that protects against transmission of a laser wavelength threat and permits vision through the film and covering the windows of a vehicle with the film by extracting the film from a housing affixed to the vehicle. A further embodiment of a method of the present invention may include composing a flexible film from a dyed substrate and a thin-film coating. These and other characteristics of the present invention are described more fully herein.

BRIEF DESCRIPTION OF THE DRAWING(S)

Having thus described the invention in general terms, reference will now be made to the accompanying drawings, which are not necessarily drawn to scale, and wherein:

Figure 3:
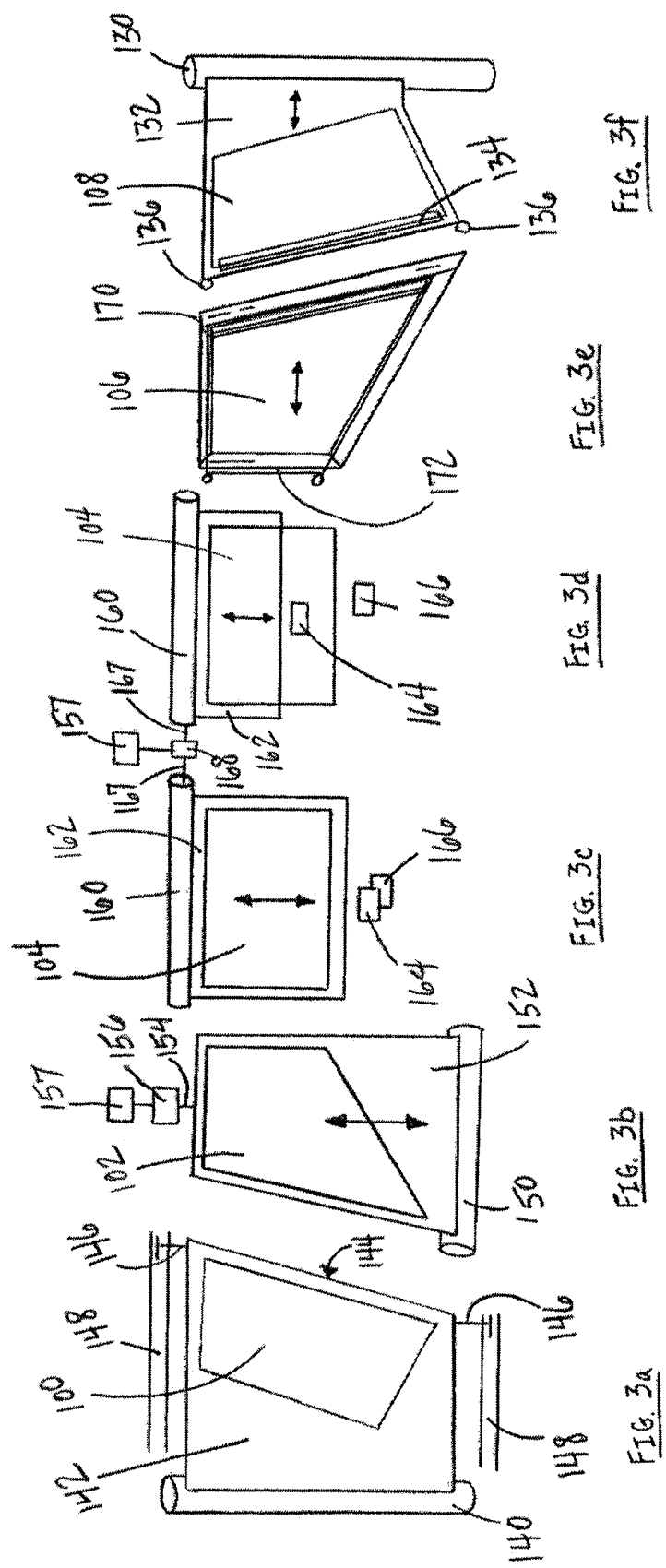
Figure 4:
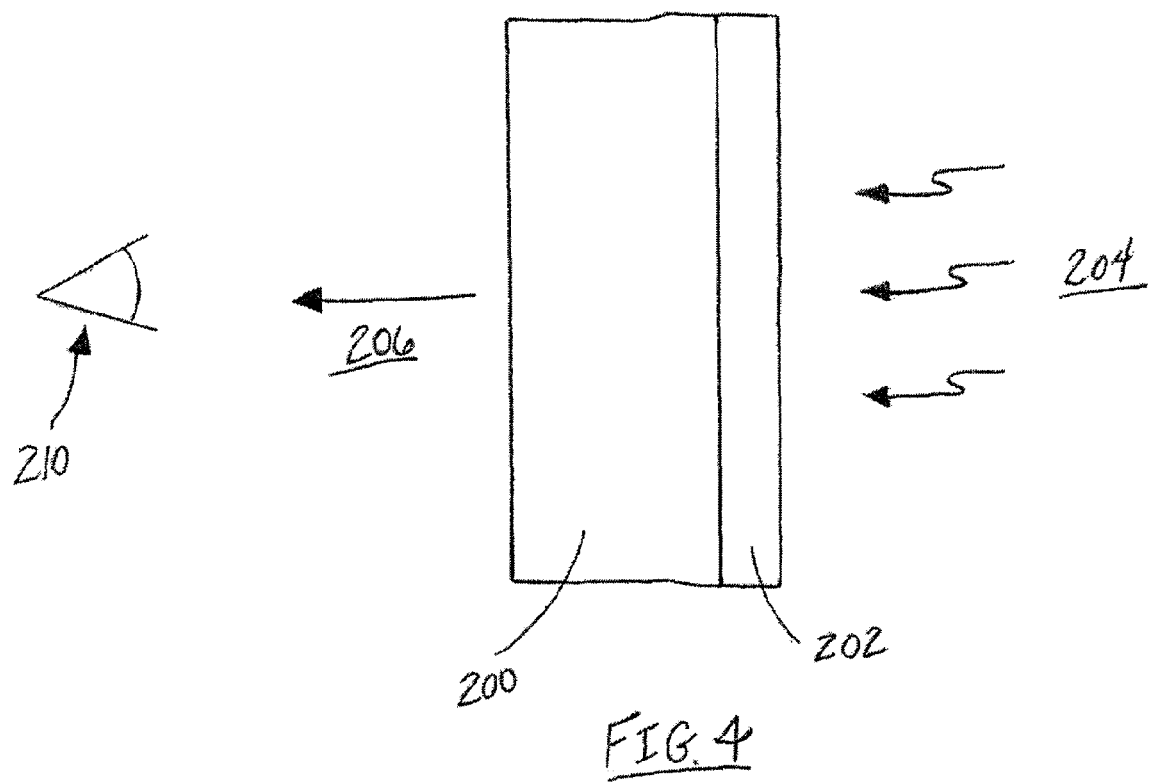

FIGS. 3a, 3b, 3c, 3d, 3e, and 3f are diagrams of stowable laser protective systems of embodiments of the present invention; and FIG. 4 is a diagram of a flexible laser protective film of an embodiment of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While embodiments of the present invention may be particularly useful in the aircraft industry for eye protection of pilots, it will be appreciated from the following description that the invention is also useful for many domains and for a variety of applications, including, for example, military ground and naval vehicle drivers and operators and executive transportation vehicles. Similarly, while embodiments of the present invention may be described with reference to protection of human eyes, the present invention is aptly suited for protection of other optical sensors. As used herein retractability is intended to mean the characteristic of being retractably-stored as in the ability to retract and extract from a protective housing, and retractably is an adverb describing functioning with this characteristic.

Figure 1:
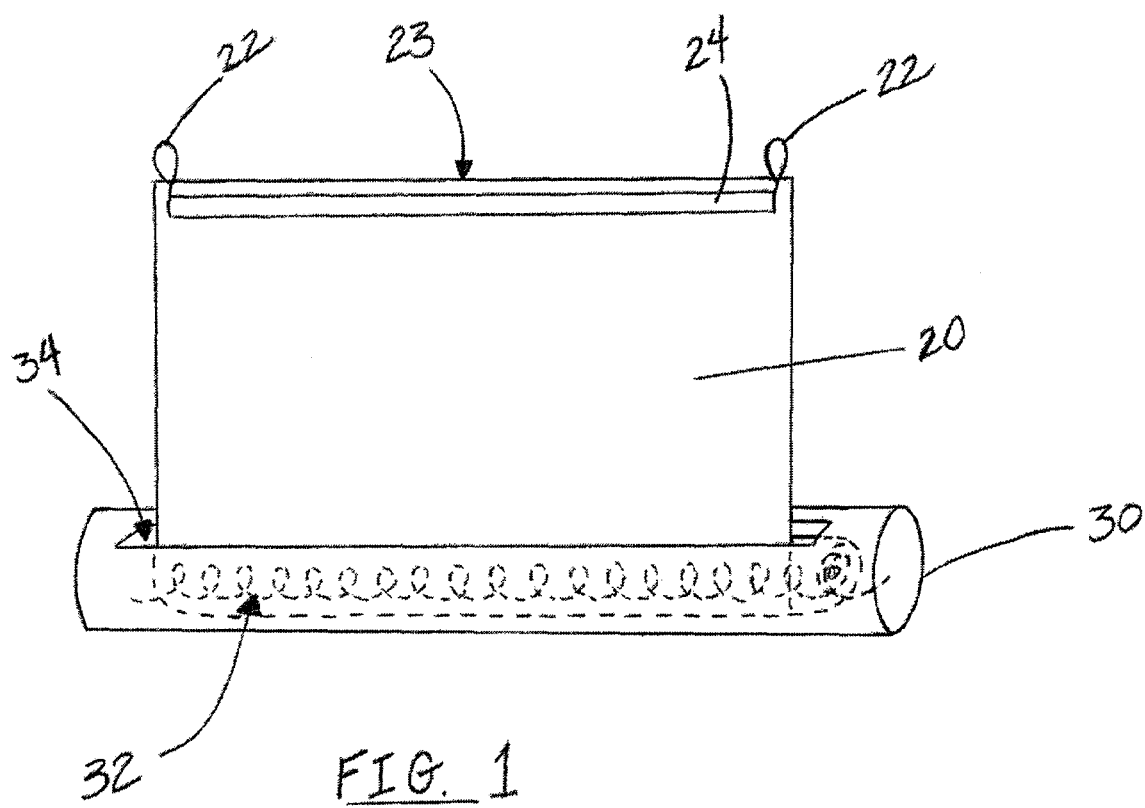
FIG. 1 is a perspective diagram of a protective laser film and protective housing of one embodiment of the present invention.

Referring to FIG. 1, provided is a perspective diagram of a protective laser film in a protective housing of one embodiment of the present invention. A protective laser film 20 is retractably stored within a protective housing 30. For example, the protective housing 30 may include a spring-loaded roller 32 as a force element for retractably storing the film 20 in the protective housing 30. One of ordinary skill in the art will recognize the different types of protective housings and retractable elements may be used such as a tension coil spring, a constant force spring, a friction-resistance roller, and the like. The protective housing may be a canister or other type of device that accommodates the storage of the protective film and retractability of the film. For example, a protective housing 30 may include an opening 34 through which the protective film 20 may be extended. Protective housings may be various shapes to accommodate such aspects as affixation to a vehicle and use of motors and other elements therewith. Protective housings may be made of different materials, such as plastic, metal, paperboard, or the like. The protective film 20 may include a rigid cross member 24 affixed to a leading edge 23 of the film to support extraction of the film 20 from the housing 30. The use of a rigid, or stiff or contoured, cross member provides the ability to shape the leading edge and support the leading edge as the film is a flexible substrate. The protective film 20 may include tabs 22 or similar devices to affix the protective film 20 in an extracted position such as covering a window.

Figure 2:
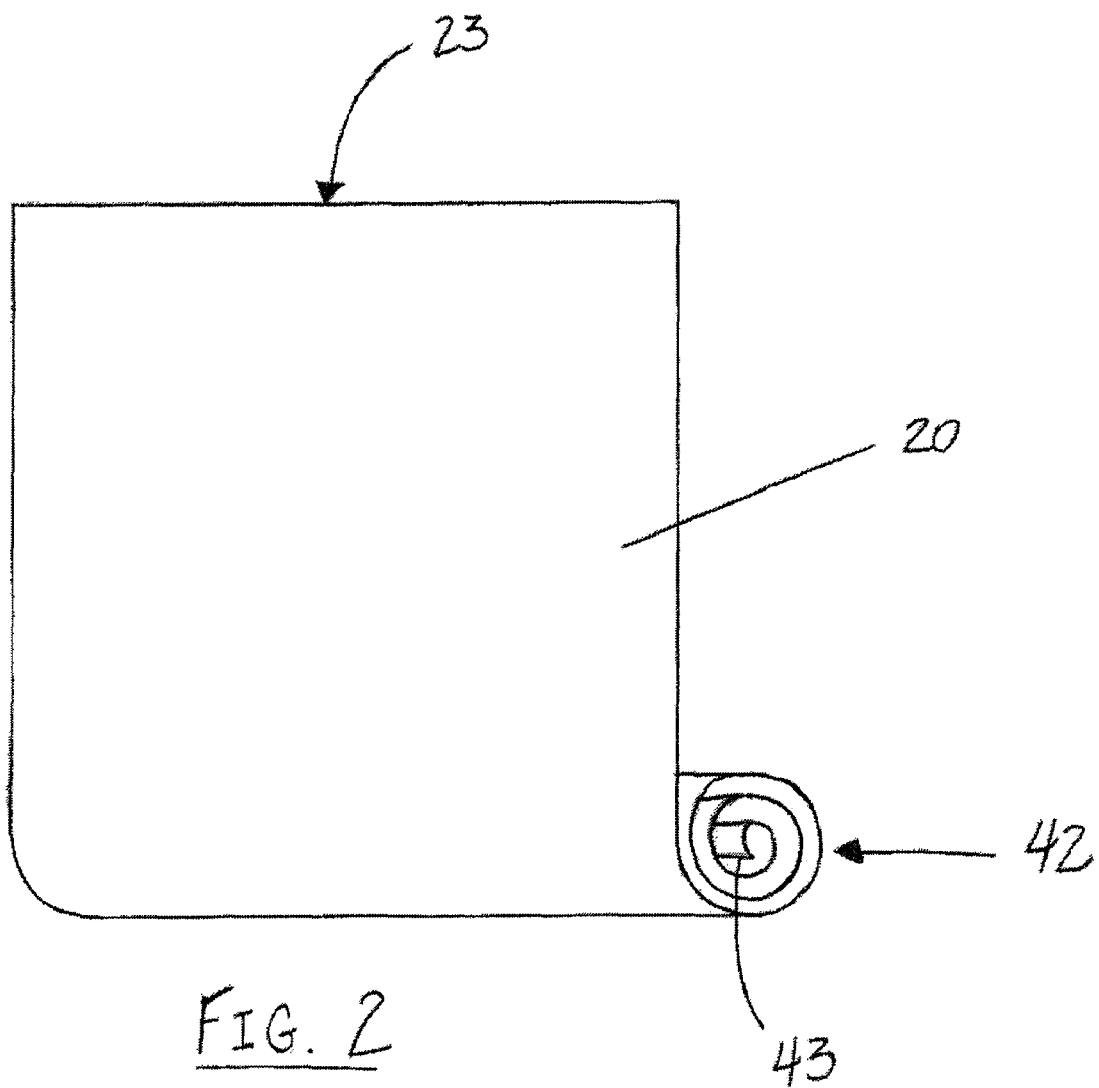
FIG. 2 is a perspective diagram of a protective laser film of one embodiment of the present invention.

FIG. 2 shows a perspective diagram of a protective laser film of one embodiment of the present invention. The flexible laser film, and substrate thereof, may be designed to provide for the protective film to return to a rolled position 42. Alternatively, or in addition, a rod or other support member (not shown) may be used to roll the flexible film thereabout and into a rolled position 42. A rod or other support member would be attached or otherwise affixed to a trailing edge 43 of the protective laser film 20 that generally remains within the housing 30. The leading edge 23 would be the first or leading surface of the protective laser film 20 to unroll or to be extracted from a protective housing.

The protective laser film may be composed of a plastic such as an acrylic or a polycarbonate which provides a durable and scratch resistant substrate. The substrate may also be resistant to ultraviolet light to provide for long life of the protective film. One of ordinary skill in the art will recognize that different substrates may provide different benefits such as flexibility, acceptance of selected dyes, or adherence of thin film coatings. Any type of flexible substrate may be used such as an acrylic or polycarbonate plastic or the like. Retraction of the film into a housing further protects the film from various external forces and energies which could damage the film.

A laser protective film may also include dyes, such as absorptive dyes, and/or coatings, such as thin film interference coatings. Typically, laser absorbing dyes are used to protect against shorter wavelengths, and thin interference film coatings are used to protect against longer wavelengths. A hybrid protective film, meaning a film including both dyes and coatings, approach reduces the impact on normal flight operations to allow for visibility by a pilot or other vehicle operator. For example, in one embodiment of the present invention the laser film may be composed of holographic or rugate filters, such as interference coating rugate notch filters, and thin film dielectric interference filters deposited on a polycarbonate substrate. Different types of light absorbing and light reflecting filters may be used where such filters can combine to provide for protection against laser and other threat wavelengths while allowing the protective film to be flexible for retractable storage in a protective housing. Dyes may be included in or on substrate material, and multiple thin film dielectric filters may be applied to the substrate. The selection of films and dyes in the substrate materials may be determined based upon the intended threat condition to be protected against and function of the film to exhibit an optical density (transmittance and/or permeability at a given wavelength) that is transparent within at least a portion of the visible spectrum to allow the pilot or operator to perform normal operations of controlling the vehicle and an optical density that is at least translucent if not impermeable at least one or more laser wavelengths intended to be protected against. These and other types of protective films are readily known to one of ordinary skill in the art and would not be limited by existing technologies where different combinations or methods of creating laser films are developed such that any protective laser film that is flexible for retractability and storage in a protective housing may be used in an embodiment of the present invention. For example, an example laser protective film may include thin film dielectric filters and rugate filters applied to a polycarbonate substrate injected with advanced dyes. Filters, dyes, and coatings may be selected based upon expected laser threat wavelengths. And as threat wavelengths change, protective films using different filters, dyes, and coatings may be exchanged in the protective housings of vehicles. Accordingly, protective housings of embodiments of the present invention may provide for exchange of protective films such as where the housing may open or a rolled film can be inserted into and removed from an end of a housing. Similarly, one alternate embodiment of the present invention may use separate films and one or more housings to protect against multiple threats, such as where different films may be used to cover a vehicle window at different times during flight or near different threat locations.

Referring to FIGS. 3a, 3b, 3c, 3d, 3e, and 3f, diagrams of stowable laser protective systems of embodiments of the present invention are provided as shown in relation to a typical configuration of windows of an airplane cockpit, such as a configuration including two front windows 104, two angled windows 102, 106, and two side windows 100, 108. FIGS. 3a, 3b, 3c, 3d, 3e, and 3f are provided together to show this type of example configuration; however, each of FIGS. 3a, 3b, 3c, 3d, 3e, and 3f include different example embodiments of the present invention (except that FIGS. 3c and 3d show mirror image configurations of the other). Protective housings of embodiments of the present invention may be mounted in relation to windows, such as a protective housing 140 beside a window 100 in FIG. 3a, a protective housing 150 below a window 102 in FIG. 3b, a protective housing 160 above a window 104 in FIGS. 3c and 3d, a protective housing 170 within a window 106 such as part of a window gasket as in Gs FIG. 3e or between the panes of a window, or a protective housing 130 beside a window 108 in FIG. 3f. Different embodiments of the present invention may employ various methods and features for extracting and retracting a protective laser film relative to the protective housing. For example, with reference to FIG. 3f, a spring-loaded roller or the like may be used as a force element for retracting a protective film 132 into a protective housing 130. The protective film may be manually extracted from the protective housing 130 such as using a nylon string and attached in an extracted position with tabs 136. A rigid cross member 134 may be used to support the manual extraction and fixation of the extracted film in a position to cover a window 108.

In a further embodiment shown in FIG. 3a, a protective film 142 may be extracted from and/or retracted into a protective housing 140 using a motorized drive system such as a track or groove system with elements 146 affixed to a leading edge 144 of a protective film 142, wherein the elements 146 translate along a track or within a groove 148 to provide for covering a window 100 with a protective film 142. One of ordinary skill in the art will recognize that the track or groove may follow the contour of the surface adjacent to the window, and, because the protective film is flexible, the protective film 142 is capable of extracting or retracting along a curved or contoured path. Further, the shape and size of a protective laser film may conform to the shape and size of the window being covered by the protective film. For example, the leading edge 144 of a protective film 142 may be angled to match an angle of a window 100. A leading edge or side of a laser protective film may not be parallel with a trailing edge or an opposite side. Further, edges and sides of a protective film need not be linear but may conform to a polygon or curved shape of a window that is being covered to provide complete eye protection without gaps between the protective film and edges of the windows.

A motor such as any electronically powered device may be used for extraction and/or retraction of a protective laser film relative to a protective housing. For example, with respect to FIG. 3b, a motor 156 may be attached with an element 154 to a leading edge of a protective film 152 in order to raise and lower, or extract and retract, a protective film 152 relative to a protective housing 150. Different types of motors and different uses and configurations of motors may be employed in embodiments of the present invention. For example, with respect to FIGS. 3c and 3d, a motor 168 may be attached to the end of a protective housing in order to drive a rod 167 affixed to a trailing edge, or a leading edge, of a protective film 162. Similarly, different methods of extraction and retraction may be employed in combination with a motor or different force elements. For example, where a protective housing 160 is mounted above a window 104, a weight element 164 may be used to descend or extract the protective laser film 162 from the protective housing 160 in a direction to cover a window 104 and the motor 168 can retract the film 162. Just as tabs 136 in FIG. 3f or track elements 146 in FIG. 3a may be used to affix a protective laser film in an extracted position, any type of means by which a protective laser film may be affixed in an extended position to cover a window may be used with embodiments of the present invention including, but not limited to, hooks, snaps, loops, plastic hooking strips, and fastening tape. For example, with respect to FIGS. 3c and 3d, a metal weight element 164 may be secured in a position to cover the window using a magnetic element 166 which is electronically controlled such as by energizing a magnetic field when the motor has extended the protective laser film 162 in a position to cover the window 104. The magnetic element 166 may be de-energized to allow for release of the weighted element 164 to allow the motor 168 to retract the protective film 162 into the protective housing 160.

A protective housing may be mounted adjacent to a window or integrally as part of a window gasket or between glass panes of a window. For example, with respect to FIG. 3e, a protective housing 170 may be mounted as part of the left window gasket of a window 106 to allow for a protective laser film 172 to cover the window 106 in a manner that is not intrusive of the other features or devices inside a vehicle. An embodiment of the present invention which includes a protective housing and laser film between the panes of a window and which is automatically controlled by a control element using a motor and force elements could completely eliminate the need for any pilot interaction with an embodiment of a stowable eye protection system of the present invention. Additionally, or alternatively, a pilot may be able to control the extraction or retraction of a protective laser film such as by using a switch, similar to an automatic window control of an automobile. Embodiments of the present invention may be used to protect against laser threats such as during take-off and landing or presence in or near a threat location, such as traveling through a hostile environment. A pilot may manually or semi-automatically control use of, and/or control elements 157 such as a process controller or computer system may automatically control use of, embodiments of stowable laser protection systems of the present invention. For example, an altimeter may be used to control automatic deployment of protective laser films during take-off and on approach and landing and to control retraction upon landing and achieving a predetermined altitude. A GPS system may be used to deploy and retract a protective laser film based upon proximity to or distance from threat locations.

FIG. 4 is a diagram of a flexible laser protective film of an embodiment of the present invention. As previously described with reference to FIG. 2, a protective laser film may include a dyed flexible substrate 200 and a thin film coating 202 such as a rugate filter. This combination or hybrid protective laser film filter protects an optical sensor such as a pilot's eye 210 from harmful laser light 204, but allowing visible spectrum 206 as would be required for normal operation of a vehicle by a pilot or other navigator.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stowable laser protection system, comprising:
a laser protective film, wherein said film is flexible and has a leading edge and a trailing edge; and
a protective storage housing operably connected to said film, wherein said film is adapted to be alternately extended from and retractably-stored in said housing, and wherein said housing is adapted to be at least one of integrated into a gasket of a window and extended between a first layer and a second layer of a window.

2. The system of claim 1, wherein said film comprises a dyed substrate and a thin-film coating.

3. The system of claim 2, wherein a combination of said dyed substrate and said thin-film coating permits said film to exhibit an optical density that is transparent within at least a portion of the visible spectrum and at least translucent at one laser wavelength.

4. The system of claim 2, wherein said dyed substrate comprises a plastic.

5. The system of claim 4, wherein said plastic is an acrylic or a polycarbonate.

6. The system of claim 2, wherein said thin-film coating comprises a dielectric or rugate filter.

7. The system of claim 1, further comprising a cross member affixed to said leading edge of said film to allow for extension of at least part of said film from said housing.

8. The system of claim 1, wherein said protective storage housing comprises a force element selected from the group of: a spring-loaded roller, a tension coil spring, a constant force spring, and a friction-resistance roller.

9. The stowable laser protection system of claim 1, wherein said film is adapted to extend between a first and a second layer of said window.

10. A stowable eye protection system for a vehicle, comprising:
a laser protective film, wherein said film is flexible and has a leading edge and a trailing edge; and
a protective storage housing operably connected to said film and mounted to a vehicle substantially adjacent to a window of said vehicle, wherein said housing is adapted to be at least one of integrated into a gasket of said window and extended between a first layer and a second layer of a window,
wherein said film is capable of at least partially retracting into said housing for storage and being extended from said housing to cover at least part of said window.

11. The system of claim 10, wherein said housing is mounted into a gasket below said window.

12. The system of claim 10, wherein said housing is mounted into a gasket above said window.

13. The system of claim 10, wherein said housing is mounted into a gasket beside said window.

14. The system of claim 10, wherein said film is adapted to be extended between said first layer and said second layer of said window.

15. The system of claim 10, further comprising a manual control element connected to said film to permit manual extension or retraction of said film from said housing.

16. The system of claim 10, further comprising a motor connected to said film to permit motorized or motor-assisted extension and motorized or motor-assisted retraction of said film from said housing.

17. The system of claim 16, wherein said housing comprises a force element, wherein said motor permits motorized extension of said film and said force element facilitates motor-assisted retraction of said film or wherein said motor permits motorized retraction of said film and said force element facilitates motor-assisted extension of said film.

18. The system of claim 16, further comprising a control element, wherein said control element automatically activates said motor to extend or retract said film, and wherein said automatic activation is performed upon automated detection of one or more pre-determined conditions during operation of the vehicle.

19. The system of claim 18, wherein said vehicle is an aircraft and said control element activates said motor to extend said film after said aircraft descends to a predetermined landing altitude or approaches to within a predetermined distance from a threat condition.

20. The system of claim 19, wherein said control elements activates said motor to retract said film after said aircraft lands.

21. The system of claim 18, wherein said vehicle is an aircraft and said control element activates said motor to extend said film for take-off of said aircraft.

22. The system of claim 21, wherein said control elements activates said motor to retract said film after said aircraft ascends to a predetermined post-take-off altitude.

23. The system of claim 18, wherein said vehicle is an aircraft and said control element activates said motor to extend said film when said aircraft is proximate a predetermined threat location.

24. The system of claim 9, wherein said housing comprises a roller and wherein said system further comprises a motor attached to said roller.

25. The system of claim 21, wherein said motor permits motorized extension of said film.

26. The system of claim 21, wherein said motor permits motorized retraction of said film.

27. A method of protecting the vision of a vehicle operator, comprising:
provide a flexible film, wherein said film protects against transmission of a laser wavelength and permits vision through said film. and wherein laid film comprises a dyed substrate and a thin-film coating; and
covering a window of a vehicle with said film by automatically extending or retracting said film from a housing affixed to the vehicle, wherein automatically extending or retracting said film is performed upon automated detection of one or more pre-determined operating conditions related to movement of the vehicle during operation of the vehicle, and wherein the automated detection is configured to occur without interaction by an operator of the vehicle.

28. The method of claim 27, wherein covering the window of the vehicle comprises extending said film after said vehicle descends to a pre-determined landing altitude or approaches to within a pre-determined distance from a threat condition.

29. The method of claim 28, wherein covering the window of the vehicle comprises retracting said film after said vehicle ascends to a pre-determined post-take-off altitude or departs from within a pre-determined distance from a threat condition.

30. The method of claim 27, wherein covering the window of the vehicle comprises retracting said film after said vehicle ascends to a pre-determined post-take-off altitude or departs from within a pre-determined distance from a threat condition.

31. The method of claim 27, wherein covering the window of a vehicle comprises extending said film prior to and during takeoff and landing of said vehicle.

32. The method of claim 31, further comprising retracting said film after takeoff and before landing of said vehicle.

33. The method of claim 27, wherein providing a flexible film comprises integrating a housing for the film into a gasket of the window.

34. The method of claim 27, wherein covering the window of the vehicle comprises extending or retracting the film between a first and a second layer of the window.

35. A stowable eye protection system for a vehicle, comprising:
a laser protective film, wherein said film is flexible and has a leading edge and a trailing edge;
a protective storage housing operably connected to said film and mounted to a vehicle substantially adjacent to a window of said vehicle,
wherein said film is capable of at least partially retracting into said housing for storage and being extended from said housing to cover at least part of said window, and wherein said film is capable of extending between a first and a second layer of said window.

36. The stowable eye protection system of claim 35, wherein said protective storage housing comprises a force element selected from the group of: a spring-loaded roller, a tension coil spring, a constant force spring, and a friction-resistance roller.

37. The stowable eye protection system of claim 35, further comprising a motor connected to said film to provide motorized extension of said film from said housing and to permit motor-assisted retraction of said film into said housing.

38. The stowable eye protection system of claim 37, wherein said housing comprises a force element, and wherein said force element is adapted to cooperate with said motor to facilitate motor-assisted retraction of said film into said housing.

39. A stowable eye protection system for a vehicle, comprising:
a laser protective film, wherein said film is flexible and has a leading edge and a trailing edge, wherein said film comprises a dyed substrate and a thin-film coating, and wherein said film is configured to have an optical density that is transparent within at least a portion of the visible spectrum and opaque at laser wavelengths;
a protective storage housing operably connected to said film and mounted to a vehicle substantially adjacent to a window of said vehicle,
wherein said film is capable of at least partially retracting into said housing for storage and being extended from said housing to cover at least part of said window; and
a control element, wherein said control element automatically activates a motor to extend or retract said film, wherein said automatic activation is performed upon automated detection of one or more pre-determined operating conditions related to movement of the vehicle during operation of the vehicle,and wherein said automated detection is configured to occur without interaction by an operator of the vehicle.

40. The system of claim 39, wherein said vehicle is an aircraft and said control element activates said motor to extend said film after said aircraft descends to a pre-determined landing altitude or approaches to within a pre-determined distance from a threat condition.

41. The system of claim 40, wherein said control elements activates said motor to retract said film after said aircraft lands.

42. The system of claim 39, wherein said vehicle is an aircraft and said control element activates said motor to extend said film for take-off of said aircraft.

43. The system of claim 42, wherein said control elements activates said motor to retract said film after said aircraft ascends to a predetermined post-take-off altitude.

44. The system of claim 39, wherein said vehicle is an aircraft and said control element activates said motor to extend said film when said aircraft is proximate a predetermined threat location.

* * * * *